United States Patent
Beerse et al.

(10) Patent No.: US 9,596,199 B2
(45) Date of Patent: *Mar. 14, 2017

(54) ENABLING AND SUPPORTING A PRESENCE SERVER CACHE

(71) Applicant: International Business Machines Corporation, Armonk, NY (US)

(72) Inventors: Chelsea Christine Beerse, Fairport, NY (US); Patrick Joseph O'Sullivan, Ballsbridge (IE); Jeffrey B. Sloyer, Fishersville, VA (US); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

This patent is subject to a terminal disclaimer.

(21) Appl. No.: 13/860,571

(22) Filed: Apr. 11, 2013

(65) Prior Publication Data

US 2013/0297708 A1    Nov. 7, 2013

Related U.S. Application Data

(63) Continuation of application No. 13/465,355, filed on May 7, 2012.

(51) Int. Cl.
*G06F 15/16* (2006.01)
*H04L 12/58* (2006.01)
*H04L 29/08* (2006.01)

(52) U.S. Cl.
CPC ............ *H04L 51/04* (2013.01); *H04L 51/043* (2013.01); *H04L 67/22* (2013.01); *H04L 67/24* (2013.01)

(58) Field of Classification Search
None
See application file for complete search history.

(56) References Cited

U.S. PATENT DOCUMENTS 7,552,204 B2    6/2009    Bobde et al.
7,917,468 B2    3/2011    Ariel et al.
8,032,112 B2    10/2011   Hines et al.
(Continued)

FOREIGN PATENT DOCUMENTS

CN    101453351 A    6/2009
CN    101485173 A    7/2009
(Continued)

OTHER PUBLICATIONS

International Search Report and Written Opinion Dated Oct. 3, 2013 received in International Application No. PCT/IB2013/052989, pp. 1-10.

*Primary Examiner* — Nam Tran
(74) *Attorney, Agent, or Firm* — Brian J. Colandreo, Esq.; Jeffrey T. Placker, Esq.; Holland & Knight LLP

(57) ABSTRACT

A method, computer program product, and computer system for enabling and supporting a presence server cache are described herein. A presence server cache may receive a plurality of requests to poll a status of a contact from a plurality of clients. The presence server cache may determine the status of the contact. If the status of the contact is unavailable at the presence server cache, the presence server cache may transmit a request for the status of the contact to a presence server. The presence server cache may transmit the status of the contact of the user to the plurality of clients.

9 Claims, 3 Drawing Sheets

(56) References Cited

U.S. PATENT DOCUMENTS

| | | | |
|---|---|---|---|
| 8,032,631 B2 | 10/2011 | Iino et al. | |
| 2005/0262195 A1 | 11/2005 | Ono et al. | |
| 2007/0078965 A1 | 4/2007 | Shimamura et al. | |
| 2008/0133742 A1 | 6/2008 | Southiere et al. | |
| 2008/0177857 A1* | 7/2008 | Chakra | H04L 67/1095 709/217 |
| 2008/0285540 A1* | 11/2008 | Burckart | H04L 67/24 370/351 |
| 2011/0196913 A1 | 8/2011 | Acharya et al. | |
| 2011/0196925 A1 | 8/2011 | Hans et al. | |
| 2012/0184258 A1* | 7/2012 | Kovvali | H04W 4/18 455/418 |

FOREIGN PATENT DOCUMENTS

| | | |
|---|---|---|
| WO | 2009067780 A1 | 6/2009 |
| WO | 2011107814 | 9/2011 |

* cited by examiner

ENABLING AND SUPPORTING A PRESENCE SERVER CACHE

RELATED APPLICATIONS

The subject application is a continuation application of U.S. patent application Ser. No. 13/465,355, filed on May 7, 2012, the entire content of which is herein incorporated by reference.

TECHNICAL FIELD

This disclosure relates to instant messaging systems and methods.

BACKGROUND

Instant messaging (IM) is a form of communication that offers an instantaneous transmission of text-based messages over the Internet. Features offered by many instant messaging systems may include voice or video calling, video chat, inclusion of hyperlinks to media, ability to multicast communications to multiple recipients.

IM systems may utilize presence servers. A presence server allows a user to maintain a presence subscription to an associated Instant Messaging Server, which will provide up-to-date information of a contact in a user's buddy list. Examples of information provided by the presence server include notifications in changes in status of contacts of a buddy list (e.g. on-line, offline away from desk, Do-Not-Disturb).

The status of contacts of a buddy list (e.g., status indicator) may be facilitated through a regular or clocked communication between the IM application of a client and the presence server, to exchange information on the presence information for that user's buddy list. The communication is usually configurable by the administrator for performance reasons. Large numbers of users of an IM system polling for status updates of all contacts in their buddy lists may have a greatly negative impact on performance. For example, 5,000 users who each have 500 buddies may represent a penalty of 2,500,000 subscription updates that the presence server has to maintain.

BRIEF SUMMARY

In one implementation, a method for enabling and supporting a presence server cache includes a receiving, by a presence server cache, a request for a status of an instant messaging user; searching, by the presence server cache, for a status indicator associated with the instant messaging user; determining, by the presence server cache, that the status indicator associated with the instant messaging user is not included within the presence server cache; and transmitting, by the presence server cache, a request to the presence server for the status of the instant messaging user.

One or more of the following features may be included. The presence server may create an association of a client with the presence server cache. The association of the client with the presence server cache may be based upon, at least in part, one of a geographic location, a type of client device, a user-group designation, and buddy list decisions made by a user of the client. The presence server cache may assess the association of the client with the presence server cache on a periodic basis. The presence server cache may modify the association of the client to a second presence server cache. The presence server cache may transmit a status indicator for each of a plurality of clients associated with the presence server cache to the presence server on a periodic basis. The presence server cache may receive a request for a status of an instant messaging user from a client. The presence server cache may determine the client is associated with a second presence server cache. The presence server cache may request the status indicator associated with the instant messaging user from the second presence server cache. The presence server cache may transmit the status indicator associated with the instant messaging user received from the second presence server cache to the client. The presence server cache may receive from the presence server an updated status indicator for a plurality of instant messaging users. The request for the status indicator associated with the instant messaging user may be transmitted from the presence server cache to the presence server on a periodic basis.

In another implementation, a computer program product residing on a computer readable medium has a plurality of instructions stored on it. When executed by a processor, the plurality of instructions cause the processor to perform operations including receiving, by a presence server cache, a request for a status of an instant messaging user; searching, by the presence server cache, for a status indicator associated with the instant messaging user; determining, by the presence server cache, that the status indicator associated with the instant messaging user is not included within the presence server cache; and transmitting, by the presence server cache, a request to the presence server for the status of the instant messaging user.

One or more of the following features may be included. The presence server may create an association of a client with the presence server cache. The association of the client with the presence server cache may be based upon, at least in part, one of a geographic location, a type of client device, a user-group designation, and buddy list decisions made by a user of the client. The presence server cache may assess the association of the client with the presence server cache on a periodic basis. The presence server cache may modify the association of the client to a second presence server cache. The presence server cache may transmit a status indicator for each of a plurality of clients associated with the presence server cache to the presence server on a periodic basis. The presence server cache may receive a request for a status of an instant messaging user from a client. The presence server cache may determine the client is associated with a second presence server cache. The presence server cache may request the status indicator associated with the instant messaging user from the second presence server cache. The presence server cache may transmit the status indicator associated with the instant messaging user received from the second presence server cache to the client. The presence server cache may receive from the presence server an updated status indicator for a plurality of instant messaging users. The request for the status indicator associated with the instant messaging user may be transmitted from the presence server cache to the presence server on a periodic basis.

In another implementation, a computing system include a processor and memory, which are configured to perform operations including receiving, by a presence server cache, a request for a status of an instant messaging user; searching, by the presence server cache, for a status indicator associated with the instant messaging user; determining, by the presence server cache, that the status indicator associated with the instant messaging user is not included within the presence server cache; and transmitting, by the presence server cache, a request to the presence server for the status of the instant messaging user.

One or more of the following features may be included. The presence server may create an association of a client with the presence server cache. The association of the client with the presence server cache may be based upon, at least in part, one of a geographic location, a type of client device, a user-group designation, and buddy list decisions made by a user of the client. The presence server cache may assess the association of the client with the presence server cache on a periodic basis. The presence server cache may modify the association of the client to a second presence server cache. The presence server cache may transmit a status indicator for each of a plurality of clients associated with the presence server cache to the presence server on a periodic basis. The presence server cache may receive a request for a status of an instant messaging user from a client. The presence server cache may determine the client is associated with a second presence server cache. The presence server cache may request the status indicator associated with the instant messaging user from the second presence server cache. The presence server cache may transmit the status indicator associated with the instant messaging user received from the second presence server cache to the client. The presence server cache may receive from the presence server an updated status indicator for a plurality of instant messaging users. The request for the status indicator associated with the instant messaging user may be transmitted from the presence server cache to the presence server on a periodic basis.

In another implementation, a computer-implemented method includes a presence server cache receiving a request for a status of an instant messaging user. The presence server cache searches for a status indicator associated with the instant messaging user. The presence server cache determines that the status indicator associated with the instant messaging user included within the presence server cache is not current. The presence server cache transmits a request to the presence server for a current status of the instant messaging user.

In another implementation, a computer-implemented method includes a presence server cache receiving a plurality of requests for a status of an instant messaging user. The presence server cache searches for a status indicator associated with the instant messaging user. If the status indicator associated with the instant messaging users is not included within the presence server cache, the presence server cache transmits a request to the presence server for the status of the instant messaging user. The presence server cache transmits a plurality of responses responsive to the plurality of request, wherein the plurality of responses includes the status of the instant messaging user.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
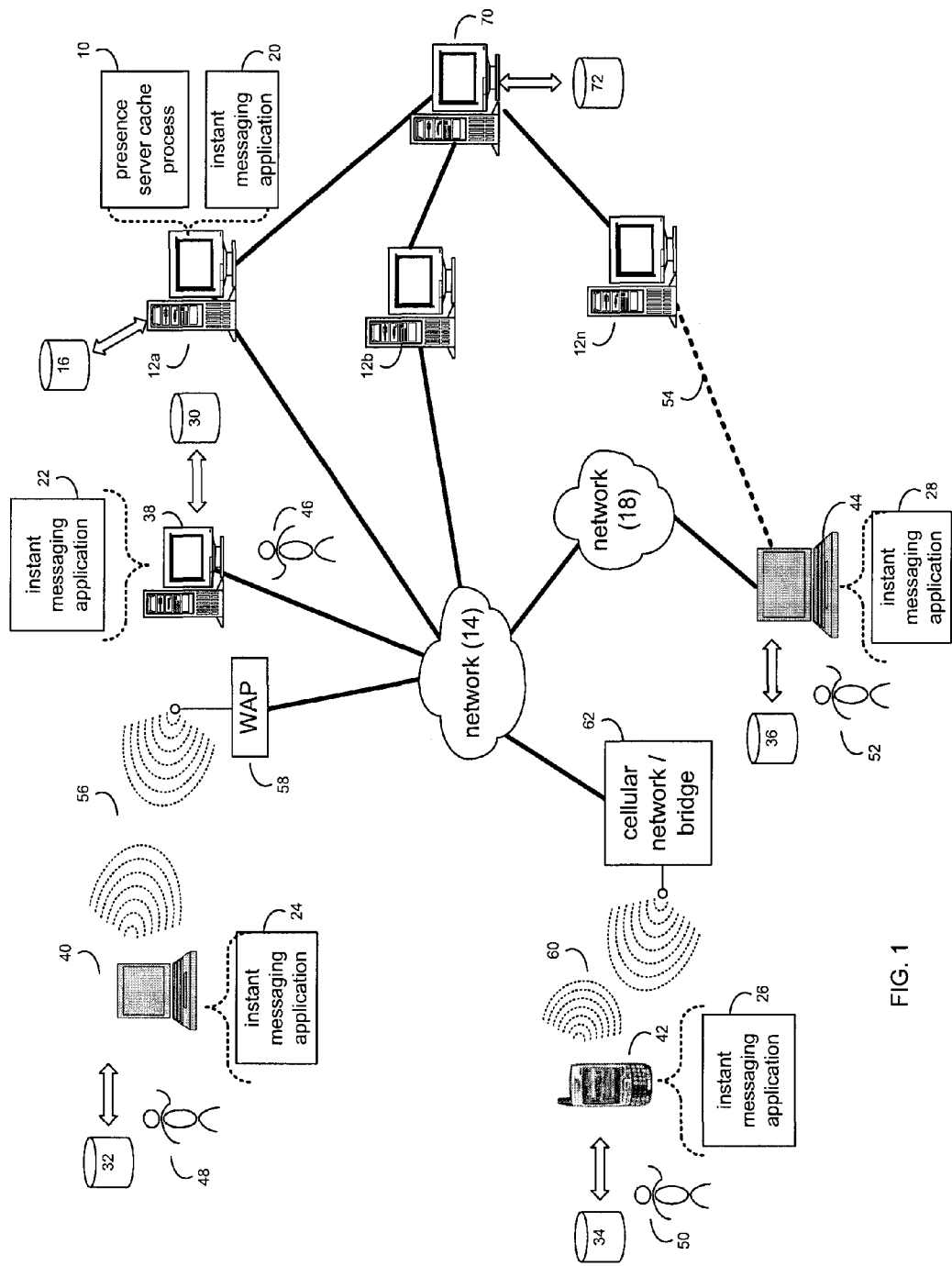
FIG. 1 is a diagrammatic view of a presence server cache process coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown presence server cache process 10 that may reside on and may be executed by one or more computers 12a, 12b, 12n (collectively referred to as 12), which may be connected to network 14 (e.g., the Internet or a local area network). Also depicted is instant messaging application 20 that may reside and may be executed by computer 12. The instant messaging application 20 may reside on the presence server cache 12, a presence server 70, or may reside on one or more other computing devices. Examples of computer 12 may include but are not limited to a single server computer, a series of server computers, a single personal computer, a series of personal computers, a mini computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, presence server cache process 10 may receive a request for a status of an instant messaging user; search for a status indicator associated with the instant messaging user; determine that the status indicator associated with the instant messaging user is not included within the presence server cache; and transmit a request to the presence server for the status of the instant messaging user.

The instruction sets and subroutines of presence server cache process 10 and server instant messaging application 20, which may be stored on storage device 16 coupled to computer 12, may be executed by one or more processors (not shown) and one or more memory architectures (not shown) included within computer 12. Instant messaging application 20 may alternatively reside on presence server 70 or other computing device. Storage device 16 may include but is not limited to: a hard disk drive; a flash drive; a tape drive; an optical drive; a RAID array; a random access memory (RAM); and a read-only memory (ROM).

Computer 12 may be connected to presence server 70. Examples of presence server 70 may include but are not limited to a single server computer, a series of server computers, a single personal computer, a series of personal computers, a mini computer, a mainframe computer, or a computing cloud. The various components of presence server 70 may execute one or more operating systems, examples of which may include but are not limited to: Microsoft Windows Server™; Novell Netware™; Redhat Linux™, Unix, or a custom operating system, for example. Presence server 70 may be coupled to storage device 72. Storage device 72 may include but is not limited to: a hard disk; a flash drive; a tap drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, IM server application 20 may interact with IM client applications 22, 24, 26, 28 to exchange of instant messages and track statuses of instant messaging users. Presence server cache process 10 may interact with and/or be incorporated with IM server application 20. In some embodiments, the IM server application 20 may reside on the presence server 70 or the presence server cache 12. In some embodiments, the IM server application 20 may reside on multiple devices.

In some embodiments, presence server 70 may collect and store (e.g., on storage device 72) data related to all users of the IM applications 22, 24, 26, 28. The data may include location of the user, type of mobile device, status of the user, contact information, and other information. Presence server cache 12 may communicate with the presence server 70 to obtain status information of all the users associated with the presence server cache 12, where the users associated with the presence server cache may be a subset of all the users of the IM application. Client devices 38, 40, 42, 44 may communicate with the server IM application 20, to exchange instant messages with other users. Presence server cache 12 may track the status information of IM users included within buddy lists of the IM users associated with the presence server cache 12.

Presence server cache process 10 may be accessed via, and/or otherwise interact with, client applications 22, 24, 26, 28. Examples of client applications 22, 24, 26, 28 may include but are not limited to a standard web browser that may execute a web-based IM client, a customized web browser for instant messaging, or a stand-alone and/or custom IM application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 may be configured to effectuate some or all of the functionality of presence server cache process 10. Accordingly, presence server cache process 10 may be a purely server-side application, a purely client-side application, or a hybrid server-side/client-side application that is cooperatively executed by one or more of client applications 22, 24, 26, 28 and presence server cache process 10.

Users 46, 48, 50, 52 may access computer 12 and presence server cache process 10 via client electronic devices 38, 40, 42, 44 (i.e., the computing devices executing client applications 22, 24, 26, 28) directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection. Client electronic devices 38, 40, 42, 44 may each execute an operating system, examples of which may include but are not limited to Apple iOS™, Microsoft Windows™, Android™, Redhat Linux™, or a custom operating systems.

As discussed above and referring also to FIGS. 2-3, presence server cache process 10 may enable and support one or more presence server caches (depicted as computers 12a, 12b). References made in this disclosure to "presence server cache 12" is intended to reflect the process 10 alone or in combination with any resources (e.g., storage device 16, any communication resources, etc.) associated with the computer 12. Presence server cache 12a may receive from IM clients 22, 24 requests 202a, 202b to poll a status of a contact of their respective buddy lists. Presence server cache 12b may receive from IM clients 26, 28 requests 202c and 202d to poll a status of a contact of their respective buddy lists. Requests 202a, 202b, 202c, 202d may collectively be referred to as 202. Presence server cache 12a, 12b may determine the status of the contact by checking status data for IM users, which may have been previously received from the presence server 70. If the status of the contact is unavailable, presence server cache 12a, 12b may transmit request 204a, 204b (collectively referred to as 204) to presence server 70, requesting the status of the contact. In response to request 204, presence server cache 12a, 12b may transmit the status of the contact to IM applications 22, 24, 26, 28.

The presence server 70 may obtain and store the status of all IM users in the system or may be capable of determining the status of all IM users in the system. One or more presence server caches 12 may obtain status data for a subset of users of the IM system from the presence server 70. The presence server 70 may determine the subset of users associated with the presence server caches 12 based on, at least in part, factors including, but not limited to, geography of the IM user, type of device used by the IM user, group designation within a corporation, or corporate hierarchy. The IM system may include multiple presence server caches 12 in communication with one or more presence servers 70. Such an architecture may permit a presence server cache 12 to support a subset of IM users (e.g., for retrieving status information regarding contacts included within buddy lists of the subset of IM users) so that all the users of the IM system may not constantly communicate with the presence server 70, which may negatively affect the performance of the presence server 70.

Figure 2:
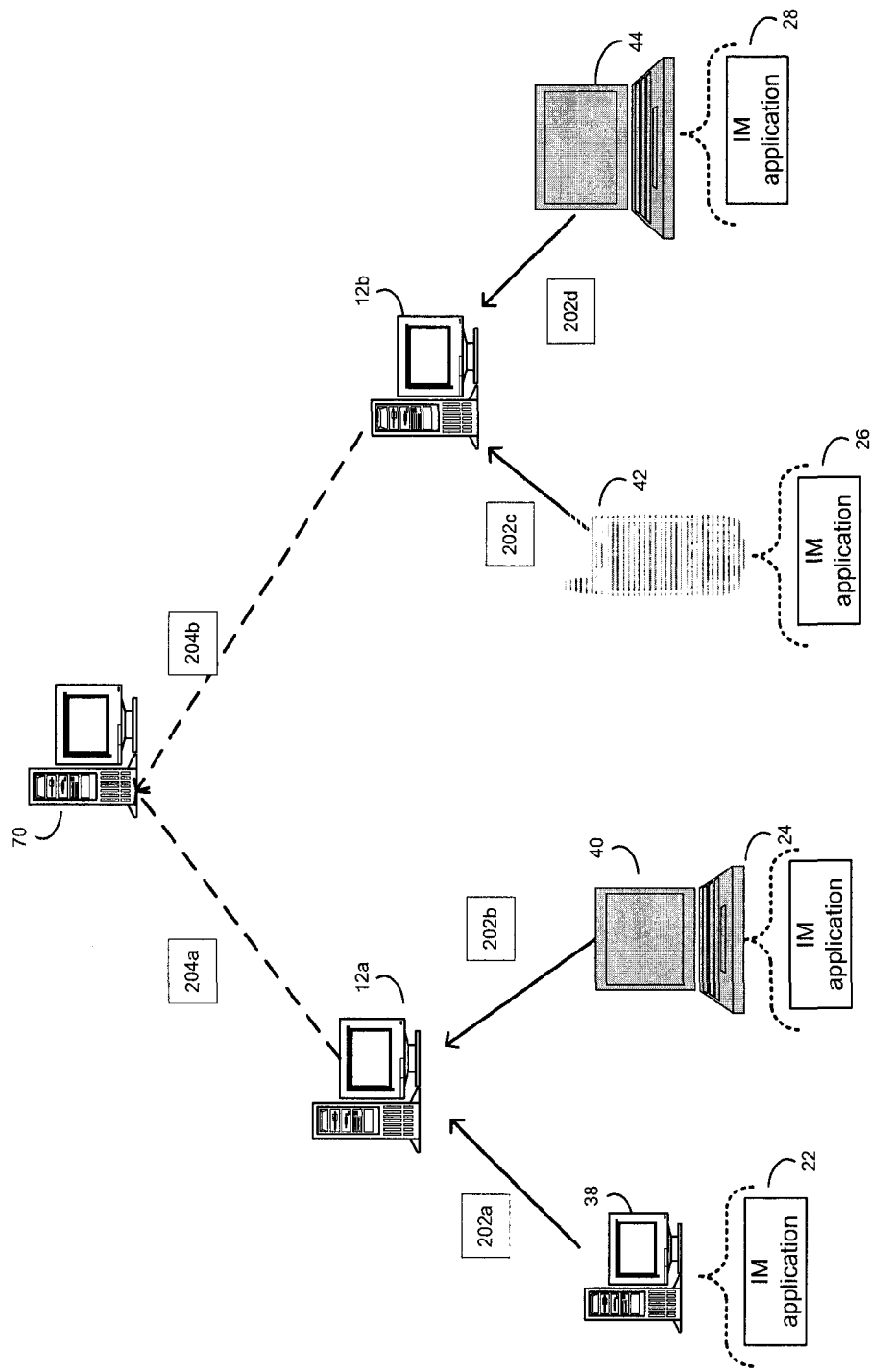
FIG. 2 is a diagrammatic view of one embodiment of the system for enabling and supporting a presence server cache.

Referring now to FIG. 2, and in more detail, a diagram of an example embodiment of a system for enabling and supporting a presence server cache is depicted. In brief overview, the system may include one or more client devices (e.g., client devices 38, 40), that may be associated with a first presence server cache (e.g., presence server cache 12a). In some embodiments, one or more client devices (e.g., client devices 42 and 44) may be associated with a second presence server cache (e.g., presence server cache 12b). A client device or IM application associated with a particular presence server cache 12 may indicate that the client device or IM application may communicate with the presence server cache 12 instead of directly with the presence server 70. Client devices 38, 40 may communicate with presence server cache 12a. In some embodiments, client devices 42, 44 may communicate with presence server cache 12b. IM applications 22, 24, 26, 28 may transmit requests 202 to presence server cache 12a or 12b for a status of a contact or buddy of their buddy lists to presence server cache 12. Presence server cache 12a and 12b may communicate with presence server 70 by requesting (e.g., via request 204) the status of the buddy or contact from presence server 70.

Presence server 70 may obtain and store different types of information associated with users and devices. For example, presence server 70 may store the buddy list of a user; a corporate directory of the company; the location of a user from which the user is accessing their buddy list; the type of device utilized by the user; the current associated between a user and a presence server cache 12; buddy list decisions made by a user; status of an IM user; and other information that pertains to users, instant messaging, and associated client devices.

In some embodiments, one or more presence server caches 12 may be deployed across multiple geographic locations between client devices 38, 40, 42, 44 and presence server 70. Presence server 70 may issue (either directly or via one or more presence server cache) instructions to client devices 38, 40, 42, 44 as to which presence server cache 12 the user or client device 38, 40, 42, 44 is associated with. Presence server cache 12 may be deployed as a plug-in on a local HTTP server, or to the local instant messaging server for that geography or location.

Each of the users may request subscription information from the presence server cache 12 for their IM buddy lists in order to maintain presence status for the buddies on their buddy list. In turn, the presence server cache 12 may collapse the superset of instant messaging client conversations that take place between each client and presence server 70 by maintaining presence status in one central place for all points of intersection of buddy lists. For instance, presence server cache 12 may transmit a request for status information related to a plurality of instant messaging clients via one payload to presence server 70 from presence server cache 12. For presence information that is not available (e.g. the user has a buddy that is not in the intersection group or in the cache) the presence server cache 12 may retrieve the status of the buddy on the buddy list from the presence server 70 on behalf of the user's instant messaging client (in some embodiments, within a payload that aggregates similar circumstances for other instant messaging clients that have been configured with an association to that same presence server cache 12). Likewise, the presence server 70 may instruct each client 38, 40, 42, 44 to communicate with the presence server cache 12 and only communicate with the presence server 70 if not satisfied (e.g., an appropriate response is not available and/or a communication failure occurs). The presence server cache 12 may behave as an ordinary client, essentially polling the presence server 70 to maintain presence updates at some frequency.

In some embodiments, at the end of each day, presence server 70 may re-scan all buddy lists associated with presence server cache 12 to optimize the presence server cache 12 and client 38, 40, 42, 44 associations. The approach may optimize the penalty (e.g., reducing the network traffic to and from the presence server 70) to a presence server 70 that services an organization by analyzing multiple geographies that presence server 70 is servicing, and may deploy one or more presence caches 12 in each of a plurality of geographic regions (or deploying one or more presence server caches 12 to service multiple geographic regions), wherein each presence server cache 12 would maintain a channel of communication with each of the clients 38, 40, 42, 44 in that geography, such that presence server 70 may take responsibility for owning the arbitration of the plurality of registered buddies for that geographic location with the presence server 70 and in turn provide this knowledge to the clients 38, 40, 42, 44 in that geographic region. Content may be stored in presence server cache 12. Such an optimization may be significant in presence server performance improvements as the degree of overlap in users' buddy lists in a local geography may be high. Therefore, instead of each client 38, 40, 42, 44 hitting the presence server 70 repeatedly for the same information, presence server cache 12 may transmit a single request to the presence server 70 on behalf of the multiple clients. Due to the degree of buddy list overlap, the penalty for going through the presence server cache 12 may represent a workload load reduction to the presence server 70 of greater than ninety percent.

In some embodiments, one or more presence server caches 12 may be deployed for a single geographic location, where users of that geographic location may be associated with the designated presence server caches 12. In some embodiments, multiple presence server caches 12 may be deployed, where users using a certain type of client device may be associated with a designated presence server cache 12 and users of a different type of client device may be associated with a different presence server cache. For instance, mobile device users may be associated with presence server cache A, whereas laptops may be associated with presence server cache B. In some embodiments, a presence server cache 12 may be designated for a group or team within an organization. For example, if a corporation had a large marketing department, where users were located all over the world, all the people in the marketing department may be associated with the same presence server cache 12.

Figure 3:
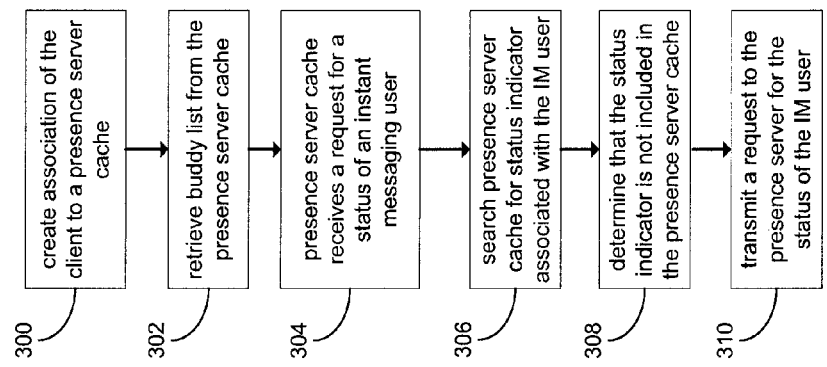
FIG. 3 is a flowchart of one embodiment of the method for enabling and supporting a presence server cache.

Now referring to FIG. 3, a flow chart of a method for enabling and supporting a presence server cache 12 is depicted. In brief overview, a presence server 70 may determine 300 an association of a client (e.g., one or more of clients applications 22, 24, 26, 28 to a presence server cache 12. The client 38, 40, 42, 44 may retrieve 302 a buddy list from the presence server cache 12. The presence server cache 12 may receive 304 a request for a status of an IM user included in the buddy list associated with one or more of clients 38, 40, 42, 44. The presence server cache 12 may search 306 the presence server cache for a status indicator associated with the IM user. The presence server cache 12 may determine 308 that the status indicator is not included in the presence server cache 12. The presence server cache 12 may transmit 310a request to the presence server 70 for the status of the IM user.

Still referring to FIG. 3, and in more detail, a presence server 70 may determine 300 an association of one or more clients to a presence server cache 12. When a user logs into an instant messaging application 22, 24, 26, 28 from a client device 38, 40, 42, 44, the client device may receive the buddy list associated with the user from the presence server 70 or the presence server cache 12. The presence server cache 12 may have received the buddy list from the presence server 70. When the buddy list is transmitted to the client 38, 40, 42, 44, the status for each of the buddy list contacts or IM users in the buddy list may also be transmitted to the client 38, 40, 42, 44. The presence server 70 may analyze multiple factors in determining and/or creating the association of an IM user to a particular presence server cache 12. For example, users located in the same geographic area (e.g. same geographic office) may result in increased overlaps in buddy list decisions (e.g., composition of the buddy list, organization of the buddy list). Therefore, the presence server 70 may divide the users into groups of individuals with overlaps and allocate or associate the group to the same presence server cache 12. Additional factors that may be used by presence server to determine associations of users may include, but are not limited to, the size of payloads to the presence server 70, frequency of requests transmitted to the presence server 70, degree of overlap in content of buddy lists among users, and type of presence server cache 12.

In some embodiments, the presence server 70 may spider multiple buddy lists of users in a geography or location and establish the degree of buddy group intersections across the users. In some embodiments, the presence server 70 may spider multiple buddy lists of users for pan-geographic employees and may generate a directed acyclic graph of buddy list decisions that individual users have made and establish the degree of intersection of who, where, and when the buddy list decisions were made.

Additionally and/or alternatively, user associations to a presence server cache 12 may be based upon, at least in part, buddy list decisions. The server may analyze buddy list decisions to increase optimization in creating associations between users and presence server caches to reduce the traffic between client devices and the presence server 70. Because information pertaining to the users and their associated buddy lists may be stored on presence server 70, the presence server 70 may analyze buddy list decisions (e.g., any changes made to a buddy list of a user, such as addition/deletion of IM users, adding IM users of the buddy list to a group, or otherwise modifying the buddy list or its organization) that have been made and determine which users are proximate to each other in the various geographic locations. For example, if three people add the same contact (e.g. Barry Smith) to their buddy lists, the presence server 70 may determine an association of the three people to the same presence server cache 12, the presence server cache 12 may transmits a single request to the presence server 70 for the status of Barry Smith, rather than having three separate transactions transmitted to the presence server 70 for Barry Smith, thereby reducing the traffic generated to determine the status of the contact.

Additionally and/or alternatively, the presence server 70 may determine the association of a user to a presence server cache 12 based upon, at least in part, the type of client device the used by the user to log into the instant messaging application. For example, a user may log into an instant messaging application from a laptop and be associated with presence server cache A. The same user may log into an instant messaging application from a mobile device and be associated with presence server cache B.

In some embodiments, the association of a user with a particular presence server cache may need to be assessed and then altered and/or changed. For example, if User X, who is currently associated with presence server cache A changes to a different geographic office, where users are generally associated with presence server cache B, the presence server 70 may determine that User X should be associated with presence server cache B and make the appropriate change in the association of User X to presence server cache B. However, in some embodiments, User X may only have temporarily changed locations and a change in association to a presence server cache may not be necessary or wanted. In such cases, the presence server 70 may preserve the association of User X to presence server cache A by analyzing other factors and determining that a change in association is unnecessary. In some embodiments, the presence server 70 may re-analyze the association of users to presence server caches on a pre-determined periodic basis, such as monthly or weekly, to ensure that associations to presence server caches 12 are updated and current. The presence server 70 may re-analyze the associations of users to presence server caches to maintain optimized associations that would reduce the amount of traffic received by the presence server 70 from clients.

When a user logs into an instant messaging application 22, 24, 26, 28, the client device 38, 40, 42, 44 may receive or download the buddy list associated with the user from the presence server 70. If the presence server 70 ascertains the particular client device used to receive the buddy list, the presence server 70 may determine the device is associated with a particular presence server cache 12 and update the association accordingly.

In some embodiments, the client 38, 40, 42, 44 may retrieve 302 a buddy list from the presence server 70. The presence server cache 12 may receive a buddy list for each of the clients associated with the presence server cache 12 from the presence server 12 and store the buddy list for each of the clients. If a user logs into the instant messaging application, the buddy list may be retrieved from the presence server cache 12 rather than the presence server 70, thereby further reducing traffic between clients and the presence server 70.

The presence server cache 12 may receive 304 one or more requests 202a, 202b, 202c, 202d (collectively referred to as 202) from one or more clients 38, 40, 42, 44 for a status of an IM user included within a buddy list associated with a user of one or more of the clients 38, 40, 42, 44. In one implementation, a method for enabling and supporting a presence server cache 12 may include the presence server cache 12 receiving multiple requests from multiple clients for the status of the same contact or IM user.

The presence server 70 may obtain and store data associated with all the IM users of the system. In some embodiments, the presence server 70 may possess the identities of all the IM users in the buddy lists for all the IM users associated with the presence server cache 12. The presence server 70 may store such data in a storage device. The presence server 70 may identify the identities of all the IM users in the buddy lists for all the IM users associated with the presence server cache 12 and obtain status indicators associated with the IM users in the buddy lists. In some embodiments, the presence server 70 may transmit the status indicators associated with the IM users in the buddy lists for all the IM users associated with the presence server cache 12 to the presence server cache 12 on a periodic basis. For example, the presence server 70 may transmit the status indicators or updates to the status indicators associated with the IM users in the buddy lists to the presence server cache 12 every 2 minutes. The periodic basis may be modified or set by an administrator of the IM system. The presence server cache 12 may store the status in storage device 16.

The presence server cache 12 may search 306 the presence server cache 12 for a status indicator associated with the contact or IM user. When the presence server cache 12 receives a request from one or more clients regarding the status of the contact or IM user, the presence server cache 12 may retrieve the stored status and transmit the status to the one or more clients requesting the status. In some embodiments, prior to transmitting the status of the contact to the client, the presence server cache 12 may communicate with the presence server 70 to verify or update the status of the contact. The request for the status of the contact or IM user may be transmitted from the presence server cache 12 to the presence server 70 on a periodic basis.

In some embodiments, the presence server cache 12 may determine 308 that the status of the contact or IM user available on the presence server cache 12 is outdated, not current, or that it is not included in the presence server cache 12. The presence server cache 12 may then make a request to the presence server 70 prior to the receipt of updated status indicators from the presence server 70 on the periodic basis. For example, the presence server 70 may transmit status indicators or updates to status indicators to the presence server cache 12 every predetermined period of time (e.g. two minutes). The presence server cache 12 may have an internal threshold to determine if the status available on the presence server cache 12 is outdated (e.g. threshold may be one minute after receipt of the previous transmission of updates from the presence server 70). If the presence server cache 12 receives a request for a status of an IM user within 1 minute of receiving a transmission from the presence server 70 (e.g. 30 seconds after receipt of transmission), the presence server cache 12 may transmit the locally available status indicator of the IM user to the requesting client. If, however, the presence server cache 12 receives a request for a status of an IM user after the threshold (e.g. 1 minute 30 seconds) after the last transmission of updates from the presence server 70, then the presence server cache 12 may transmit 310 a request to the presence server for the status of the IM user. Once the presence server cache 12 receives a response to the request, the presence server cache 12 may transmit the status indicator to the requesting one or more clients.

If the status of the contact is unavailable on the presence server cache 12, the presence server cache 12 may transmit 310 a request 204 to the presence server 70 for the status of the contact or IM user. The presence server 70 may retrieve the status of the contact from storage device 72. In some embodiments, the presence server 70 may determine the status of the contact by communicating with the device associated with the contact to obtain a current status of the contact or IM user. In some embodiments, if the status of the contact or IM user has changed, the presence server 70 may update stored status of the contact. The presence server cache 12 may transmit 310 the status of the client to the requesting one or more clients 38, 40, 42, 44.

The presence server cache 12 may determine that a client is associated with a different presence server cache 12. This may occur, for example, if a user is temporarily located in a different geographic office. By way of example, Jane Jacobs usually works in the San Diego, Calif. office, but may be temporarily working from the Hong Kong office. When Jane Jacobs signs into her instant messaging application, she may be directed to the presence server cache 12 associated with the Hong Kong office. The client device Jane Jacobs is using may request retrieval of her buddy list. However, the presence server cache associated with Hong Kong may determine that Jane Jacobs is associated with the presence server cache 12 for San Diego. The Hong Kong presence server cache 12 may then request retrieval of Jane Jacob's buddy list, and any subsequent status updates of contacts on her buddy list, from the presence server cache in San Diego rather than the presence server 70. The Hong Kong presence server cache may receive the buddy list and subsequent status updates of contacts from the San Diego presence server cache 12 and transmit the data to the client device used by Jane.

In some embodiments, the presence server cache 12 will periodically transmit the status of all IM users associated with the presence server cache 12 to the presence server 70. This transmission may occur on a periodic basis. For instance, the presence server cache 12 may transmit the status of all associated IM users to the presence server 70 every 30 seconds. This permits the presence server 70 to obtain the current status of all IM users in the IM system, if all the presence server caches, each supporting a subset of all the users, continuously transmit updated status information to the presence server 70.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, by a presence server cache, a request for a status of an instant messaging user;
   searching, by the presence server cache, for a status indicator associated with the instant messaging user;
   determining, by the presence server cache, that the status indicator associated with the instant messaging user is not included within the presence server cache;
   transmitting, by the presence server cache, a request to a the presence server for the status of the instant messaging user; and
   creating, by the presence server, an association of a plurality of clients with the presence server cache, the association based upon, at least in part, a type of client device on which the plurality of clients operate, wherein the association of the plurality of clients with the presence server cache is further based upon, at least in part, a same buddy list change made by a plurality of users of the plurality of clients, wherein the buddy list change results in a change in association of the plurality of clients with the presence server cache to a second presence server cache.

2. The computer-implemented method of claim 1, wherein the association of the plurality of clients with the presence server cache is based upon, at least in part, one of a geographic location and a user-group designation.

3. The computer-implemented method of claim 1, further comprising:
   assessing, by the presence server, the association of the plurality of clients with the presence server cache on a periodic basis.

4. The computer-implemented method of claim 1, further comprising:
   transmitting, by the presence server cache, a status indicator for each of the plurality of clients associated with the presence server cache to the presence server on a periodic basis.

5. The computer-implemented method of claim 1, further comprising:
   receiving, by the presence server cache, a request for a status of the instant messaging user from a client;
   determining, by the presence server cache, the client is associated with the second presence server cache;

requesting, by the presence server cache, the status indicator associated with the instant messaging user from the second presence server cache; and transmitting, by the presence server cache, the status indicator associated with the instant messaging user received from the second presence server cache to the client.

6. The computer-implemented method of claim 1, further comprising receiving from the presence server an updated status indicator for a plurality of instant messaging users.

7. The computer-implemented method of claim 1, wherein the request for the status indicator associated with the instant messaging user is transmitted from the presence server cache to the presence server on a periodic basis.

8. A computer-implemented method comprising:

receiving, by a presence server cache, a request for a status of an instant messaging user;

searching, by the presence server cache, for a status indicator associated with the instant messaging user;

determining, by the presence server cache, that the status indicator associated with the instant messaging user included within the presence server cache is not current; and transmitting, by the presence server cache, a request to the presence server for a current status of the instant messaging user; and creating, by the presence server, an association of a plurality of clients with the presence server cache, the association based upon, at least in part, a type of client device on which the plurality of clients operate, wherein the association of the plurality of clients with the presence server cache is further based upon, at least in part, a same buddy list change made by a plurality of users of the plurality of clients, wherein the buddy list change results in a change in association of the plurality of clients with the presence server cache to a second presence server cache.

9. A computer-implemented method comprising:

receiving, by a presence server cache, a plurality of requests for a status of an instant messaging user;

searching, by the presence server cache, for a status indicator associated with the instant messaging user;

if the status indicator associated with the instant messaging users is not included within the presence server cache, transmitting, by the presence server cache, a request to the presence server for the status of the instant messaging user; and transmitting, by the presence server cache, a plurality of responses responsive to the plurality of request, wherein the plurality of responses include the status of the instant messaging user; and creating, by the presence server, an association of a plurality of clients with the presence server cache, the association based upon, at least in part, a type of client device on which the plurality of clients operate, wherein the association of the plurality of clients with the presence server cache is further based upon, at least in part, a same buddy list change made by a plurality of users of the plurality of clients, wherein the buddy list change results in a change in association of the plurality of clients with the presence server cache to a second presence server cache.

* * * * *